United States Patent
Quendt et al.

(10) Patent No.: US 6,597,396 B1
(45) Date of Patent: Jul. 22, 2003

(54) PROCESS FOR CREATING A COLOR IMPRESSION OF A VIDEO IMAGE, AND A PROCESSING DEVICE THEREFOR

(75) Inventors: Dieter Quendt, Essingen (DE); Ulrich Nägele, Bartholomä (DE)

(73) Assignee: Carl-Zeiss-Stiftung, Heidenheim (DE)

( * ) Notice: Subject to any disclaimer, the term of this patent is extended or adjusted under 35 U.S.C. 154(b) by 0 days.

(21) Appl. No.: 09/048,238

(22) Filed: Mar. 25, 1998

(30) Foreign Application Priority Data

Mar. 25, 1997 (DE) .......................................... 197 12 434

(51) Int. Cl.⁷ ................................................ H04N 9/73
(52) U.S. Cl. .................................................... 348/223.1
(58) Field of Search ............................... 348/223, 224, 348/225, 279; 358/516

(56) References Cited

U.S. PATENT DOCUMENTS

| | | |
|---|---|---|
| 4,037,249 A | 7/1977 | Pugsley |
| 5,148,288 A * | 9/1992 | Hannah ........................ 358/298 |
| 5,202,756 A * | 4/1993 | Sasaki et al. ................ 348/279 |
| 5,270,802 A * | 12/1993 | Takagi et al. ................ 348/223 |

FOREIGN PATENT DOCUMENTS

| | | | |
|---|---|---|---|
| DE | 197 12 434 C2 | 3/1997 | ............ H04N/1/40 |
| JP | 08152566 A | 11/1996 | ........... G02B/23/24 |

OTHER PUBLICATIONS

Engelhardt, Wolfgang: Planeten, Modne, Ringsysteme: Kamerasonden erforschen unser Sonnensystem, Basel, Birkenhäuser–Verlag, 1984, S. 151–159 und Farbbild nach S. 176.

Lang, Heinwig, Farbwiedergabe in den Medien, Götten, Muster–Schmidt Verlag, 1995, S. 217–218 u. 241–243.

* cited by examiner

Primary Examiner—Wendy R. Garber
Assistant Examiner—Rashawn N. Tillery

(57) ABSTRACT

A process for balancing a video signal is set forth. In order to be able to utilize, with particular advantage in the medical field, processes that have been known for a long time, the video signal is balanced in a manner such that the color effect of an image, displayed by a monitor, of a white surface that is illuminated with a selected light source corresponds as closely as possible to the color effect of the original white surface that results from direct observation by the human eye.

10 Claims, 2 Drawing Sheets

PROCESS FOR CREATING A COLOR IMPRESSION OF A VIDEO IMAGE, AND A PROCESSING DEVICE THEREFOR

BACKGROUND OF THE INVENTION

1. Field of the Invention

The invention relates to a process for balancing a video signal, and more particularly, to white balancing a video signal, and also to image processing equipment for carrying out the process.

2. Discussion of Relevant Art

Processes of the above-mentioned kind are known in great number and variety in the art, for example, under the term "white balancing". The white balancing processes are usually used to balance a video signal so that a white subject always produces a video signal that corresponds to a defined white signal in the respective video standard, completely independently of the illumination source that illuminates the white subject Such video standards are, for example, PAL or NTSC, in which the color white is fixedly defined.

Many different circuits are known from the state of the art for carrying out white balancing, and carrying out the white balancing fully automatically or semi-automatically.

In a process for semi-automatic white balancing, described by way of example, a white surface, such as for example a white sheet of paper, is positioned in front of a video camera and, on pressing a button, an amplification factor is determined for each of the three color channels red, green and blue, such that the three signals are of equal magnitude after amplification, and the balanced video signal produces a white color on a monitor. The amplification factors that are determined are then stored in a corresponding memory for further use of the video camera, and remain constant until the next white balancing of the video camera.

In contrast to semi-automatic white balancing, in fully automatic white balancing the amplification factors are not determined only once by a white balancing, but are continuously adjusted during picture taking. In a process described here by way of example, the video camera has a sensor for this purpose, in the neighborhood of the objective that constantly measures the spectral distribution of the illumination source and continuously derives amplification factors from the spectral distribution of the illumination source that are then used for the corresponding amplification of the individual color components of the video signal.

The characteristic feature of conventional white balancing devices is that a video signal is produced, completely independently of the kind of illumination of a white subject, and corresponds to the defined white signal of the video standard that is used.

SUMMARY OF THE INVENTION

The object of the invention is to provide a process for balancing a video signal, and a corresponding equipment for carrying out the process, which can be used with particular advantage in the field of medical technology.

This object of the invention is achieved by a process comprising illuminating a white surface with a selected illumination source, balancing the video signal in such a manner that the color effect of an image of the white surface displayed by a monitor, corresponds as closely as possible to the color effect that results from direct observation by the human eye of the white surface. The image processing device comprises an imaging device that produces a video signal of photographed subjects, a balancing unit that balances the video signal such that the color impression of an image displayed by a monitor of a white surface photographed by the image device and illuminated with a selected illumination source corresponds as closely as possible to the actual color impression of the white source resulting from direct observation by the human eye, based on the selected illumination source.

An important concept of the invention is that the video signal is balanced in such a manner that the color effect of an image of a white or colored surface shown by a monitor corresponds as closely as possible to the color effect of the photographed surface, taking into account the color temperature of the illumination source used.

This provides the particular advantage that the images of subjects taken by the video camera are displayed on the monitor exactly the same as they would appear on direct observation of the corresponding subjects depending upon the respective illumination source. This is particularly desirable in many fields of medical technology because a substantially more realistic impression of the image arises for the observer of a corresponding video image. This can be of great advantage when details of an operation are photographed with a video camera and an observer has to quickly find his way around the photographed images.

The balancing of the video signal preferably takes place in that, in a manner known per se, the video signal is white balanced in a first step, and additionally a correction signal is determined, which corresponds to the kind of illumination source that illuminates the white surface, and based on which the white balanced video signal is corrected.

This has the particular advantage that a video camera that can be purchased as standard equipment with a white balancing unit built into it can be used for carrying out the process according to the invention, and only a correction unit has to be provided in addition, which determines the correction signal.

The white balancing can be carried out in various ways that are already sufficiently well known from the state of the art The determination of the kind of illumination source can also take place in various ways. One possibility could be that several different illumination sources are connected directly to the video camera by means of an electrical lead, and that on switching on one of the illumination sources a corresponding signal is furnished to the video camera, and based on this signal the video camera determines the correction signal. Another possibility would be, for example, to provide in the video camera a sensor that can determine the spectral distribution of the illumination source. Based on the results of the sensor, the exact illumination source is determined and the corresponding correction signal is determined.

In a particularly simple embodiment, the kind of illumination source is determined from the non-balanced video signal. This embodiment has the advantage that the connecting leads to the illumination source, or the sensor for measurement of the spectral distribution of the illumination source, can be dispensed with. The kind of illumination source can be determined from the difference amounts of different color components of the non-balanced video signal.

After the kind of illumination source has been determined, the value of the correction signal corresponding to the illumination source that was determined can be read out from a memory.

DETAILED DESCRIPTION OF PREFERRED EMBODIMENTS

Figure 1:
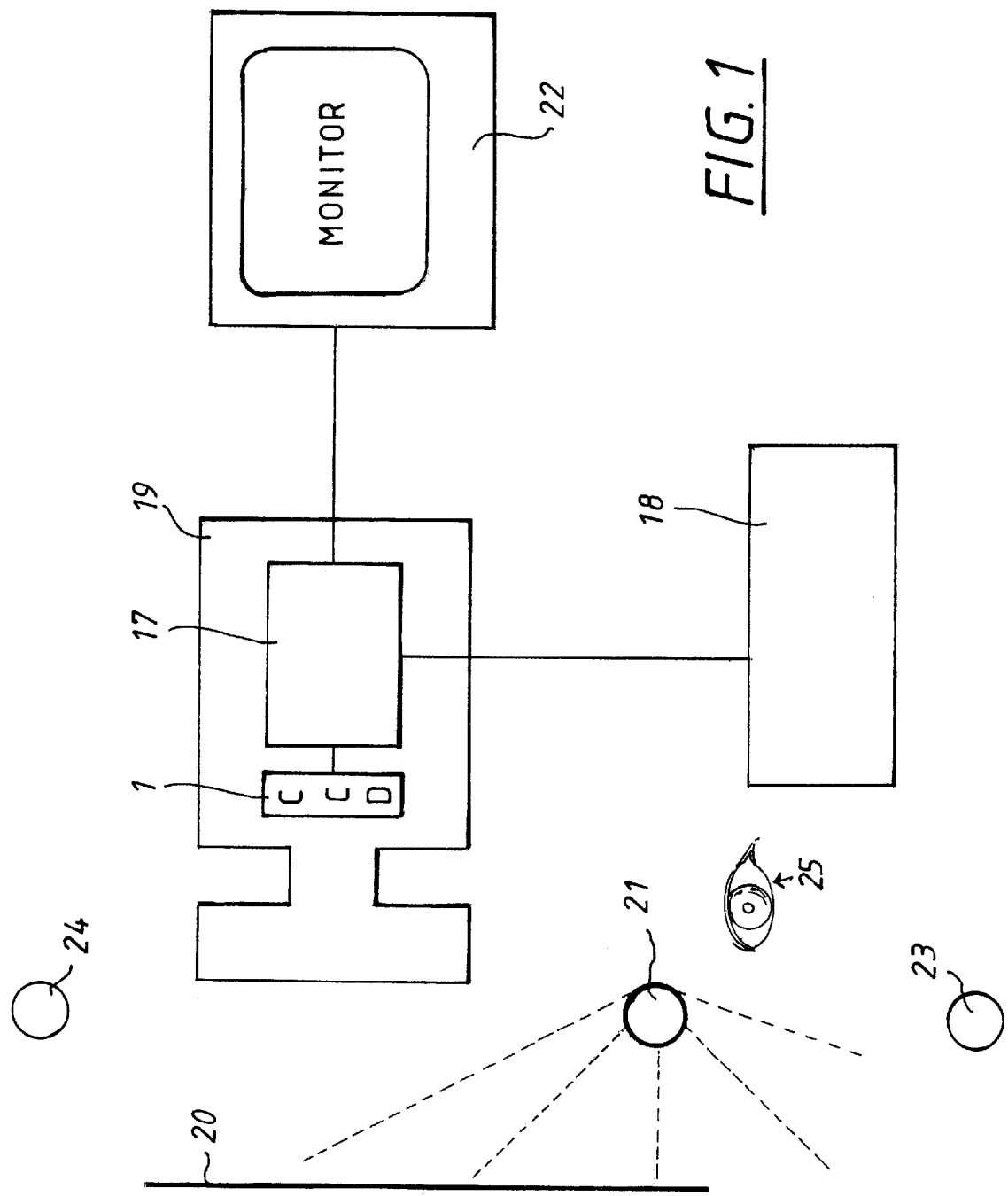
FIG. 1 shows schematically an image processing device for carrying out the process according to the invention for balancing a video signal.

FIG. 1 shows, purely schematically and by way of example, a representation of an image processing device according to the invention. The image processing device has a video camera (19) in which an imaging unit (1) is provided in the form of a CCD array, for the production of a video signal of a photographed subject. In addition, the image processing device has a balancing unit consisting of a white balancing unit (17) and a correction unit (18), which balances according to the invention the video signal produced by the imaging unit (1). The balanced signal is then delivered by the video camera (19) via a lead to a monitor (22) and displayed by the latter.

The balancing unit (17, 18) balances the video signal delivered from the imaging unit (1) in such a manner that the color effect of an image of a white or colored surface (20) displayed by the monitor (22) corresponds as closely as possible to the actual color effect of the surface (20) as directly perceived by the human eye.

The exact manner of functioning of the balancing unit (17, 18) will now be explained in more detail with reference to FIG. 2, which shows a purely schematic circuit diagram of parts of the image processing device according to FIG. 1. In this connection it should be mentioned that the balancing unit (17, 18) concerned is a semi-automatic balancing unit in which the balancing takes place by pressing a button of a switch (not further shown) on the video camera. For the balancing, first a white sheet of paper is arranged in front of the video camera (19), the white surface (20) being illuminated by means of an illumination source (21) in the embodiment shown here.

The mode of operation of the white balancing unit (17) of the balancing unit (17, 18) will now be described in more detail, in connection with FIG. 2.

Figure 2:
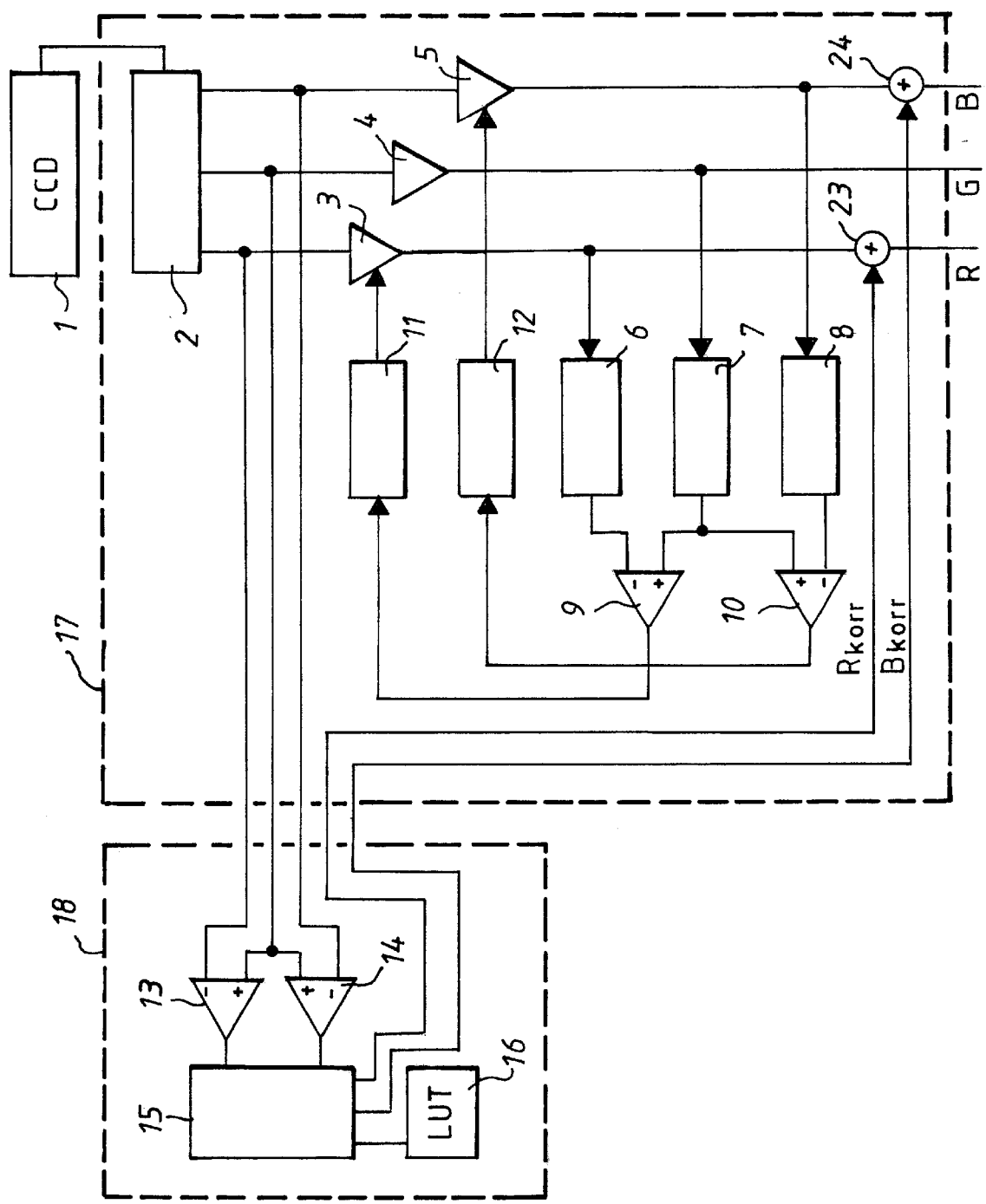
FIG. 2 shows a schematic circuit diagram of parts of the image processing device according to FIG. 1.

As can be seen in FIG. 2, the imaging unit (1) is directly connected to a decoder (2) that divides the video signal into a red signal (R), a green signal (G) and a blue signal (B). The red (R), green (G) and blue (B) signals are respectively amplified by means of a signal amplifier (3, 4, 5) according to a predetermined amplification factor. The amplification factor for the green signal (G) is constant, while the amplification factors for the red signal (R) and the blue signal (B) are first determined by the white balancing unit in such a manner that a video signal consisting of the red (R), green (G) and blue (B) signals gives rise to a white image. This is the case when the red signal (R) is equal to the green signal (G), which is equal to the blue signal (B).

In order to achieve this, the amplified color signals are respectively connected to a peak detector (6, 7, 8) that determines a peak value of the respective associated color signal. The determined peak values are delivered to differential amplifiers (9 and .10), such that a signal that is proportional to the difference between the green signal (G) and the red signal (R) is present at the output of the differential amplifier (9), while a signal which is proportional to the difference of the green signal (G) and the blue signal (B) can be obtained from the differential amplifier (10). The corresponding difference signals are respectively delivered to an integrator (11, 12), which integrates the signals over a defined period of time, the beginning of the period of time of integration is established by pressing the button to start the balancing process. After the integration, a corresponding amplification factor, proportional to the integrated value, is stored in a memory contained in the integrator (11, 12), until a new white balancing process is started. Thus, after the white balancing, a constant amplification factor is present in the integrator (11) for the amplifier (3) of the red signal (R), and a constant amplification factor is likewise present in the integrator (12) for the amplifier (5) of the blue signal (B). The proportionality factor with which the integrated value is respectively multiplied in order to obtain the amplification factor is established such that when a white surface is imaged by the imaging unit (1), a white balanced video signal is produced after the signal amplifiers (3, 4, 5) and corresponds to a white surface which has been imaged using a standard light source.

It should again be expressly mentioned at this point that the white balancing unit (17) described in this case is only an embodiment which is by way of example, and that it goes without saying that any other white balancing unit known in the state of the art can also be used.

According to the invention, the balancing unit (17, 18) of the image processing device additionally has a correction unit (18) that will be described in more detail hereinbelow, will reference to FIG. 2. The operation of the correction unit (18) is likewise started by pressing a button, as described hereinabove in connection with the white balancing unit (17). The correction unit (18) has two differential amplifiers (13, 14), which are connected to the color signals produced by the decoder (2) before they reach the signal amplifiers (3, 4, 5), such that the differential amplifier (13) provides a signal proportional to the difference between the green signal (G) and the red signal (R), and the differential amplifier (14) provides a signal proportional to the difference between the green signal (G) and the blue signal (B).

The processing unit (15) now determines which of several defined illumination sources (21, 23, 24) is concerned here, based on the difference signals. For this purpose, corresponding to the difference signals from a memory (16), which is embodied in the form of a non-volatile write-read memory (PROM, EPROM, EEPROM) as a look-up table, corresponding correction signals ($R_{corr}$, $B_{corr}$) are determined and are added in the form of an offset to the red signal (R) at the point (23') and to the blue signal (B) at the point (24').

The memory (16) is constructed such that the following respective four parameters are stored in a set for each of the different illumination sources (21, 23 24):

1. Amount of difference arising at the differential amplifier (13) between the red signal (R) and the green signal (G) due to the illumination source.
2. Amount of difference arising at the differential amplifier (14) between the blue signal (B) and the green signal (G) due to the illumination source.
3. Correction signal ($R_{corr}$) for the red signal (R), to be added at the point (23') to the amplified red signal (R).
4. Correction signal ($B_{corr}$) for the blue signal (B), to be added at the point (24') to the amplified blue signal (B).

The correction signals ($R_{corr}$, $B_{corr}$) are determined from the memory (16) by comparison of the difference amounts supplied by the differential amplifiers (13 and 14) with the difference amounts stored in the memory (16), and the correction signals ($R_{corr}$, $B_{corr}$) of that parameter set are selected that best agrees with the difference amounts.

The balancing unit (17, 18) then operates such that the white balancing unit (17) white balances the video signal in a manner which is known per se, and furthermore the correction unit (18) additionally produces a correction signal ($R_{corr}$, $B_{corr}$) by means of which the white balanced video signal is corrected.

Since the correction unit (18) is directly connected to the video signal, classified by the decoder (2), of the imaging device (1), the kind of the illumination source (21) is determined from the video signals (R, G, B) supplied by the imaging device (1), the kind of illumination source (21) being in particular determined by means of the differential amplifiers (13, 14) from the difference amounts of different color components (R, G, B) of the video signal.

Balancing of the unit shown takes place as follows:

In a first step, one of the illumination sources (21, 23, 24) is switched on; these can be different illumination sources, such as, for example, a xenon illumination source or a halogen illumination source. In the next step, the white surface is positioned in front of the video camera, and the semi-automatic white balancing of the video camera is carried out by pressing a button on a switch of the video camera. As described hereinabove, the amplification parameters for the amplifier of the red component (R) and for the amplifier of the blue component (B) are determined in the white balancing unit (17).

Furthermore, by pressing the button, the kind of illumination source (21) is additionally determined in the correction unit (18), and the correction signal ($R_{corr}$, $B_{corr}$) for the red signal (R) and for the blue signal (B) is read out from the memory (16), corresponding to the illumination source that was switched on. The signal that has been balanced in this manner is then passed to the monitor (22), on which the balanced video signal is then displayed.

The values for the corresponding correction signals ($R_{corr}$, $B_{corr}$) and the values at the differential amplifiers (13, 14) that correspond and precisely define the correction signals when they are to be read out, can be written into the memory (16) in a calibration mode that can be set by a corresponding push button. For this purpose, the white surface (20) is positioned in front of the video camera, one of the illumination sources (21, 23, 24) is switched on, and the calibration mode is started by pressing a corresponding button.

The calibration in the image processing device takes place as follows. Directly after starting the calibration mode, the video signal, as described hereinabove, is white balanced by the white balancing unit (17). At the same time, correction signals are produced by the processing unit,(15), which can be manually changed by means of a corresponding push button. The correction signals are now changed until the color effect of the image of the white surface (20) on the monitor (22) is in agreement with the original effect of the white surface (20). The agreement can be verified either by the human eye or else with a spectrometer. When this is attained, the abovementioned parameter set, consisting of the difference signals of the differential amplifiers (13, 14) and the correction signals that have been set, is stored in the memory (16) by pressing a further button.

The process is carried out in the same manner for all the other illumination sources (21, 23, 24), so that a parameter entry is present in the memory (16) for each of the illumination sources (21, 23, 24). When the correction device (18) is used during the use of the video equipment, the signals applied to the differential amplifiers (13, 14) are then simply compared with the parameters stored in the memory (16), and that parameter set is read out with which the signals correspondingly agree. The correction signals ($R_{corr}$, $B_{corr}$) stored in the parameter set are then correspondingly added as offsets, as described hereinabove, to the signal lead for the red signal (R) at the point 23' and the signal lead for the blue signal (B) at the point 24'.

We claim:

1. A process for balancing a video signal comprising:
   illuminating a white surface with a select illumination source;
   producing a video signal by video-monitoring the white surface;
   white balancing the video signal; and
   providing a correction signal for the white balanced video signal which is read out from a memory and which corresponds to said selected illumination source adding this correction signal as an offset to the white balanced video signal in such a manner that a color impression of the white surface corresponds closely to an actual color impression of the white surface that results from direct observation by a human eye of the white surface.

2. The process according to claim 1, in which said correction signal corresponds to the selected illumination source that illuminates the white surface.

3. The process according to claim 2, comprising determining the selected illumination source from a video signal that has not been balanced.

4. The process according to claim 3, further comprising determining the illumination source from difference amounts of different color components of the video signal that has not been balanced.

5. The process according to claim 1, further comprising reading out a value of the correction signal corresponding to the illumination source from a memory.

6. The process according to claim 1, in which the correction signal is offset to the video signal.

7. An image processing device, comprising:
   an imaging device that produces a video signal of photographed subjects;
   a white balancing unit that white balances the video signal;
   a correction unit that produces a correction signal which is read out from a memory and which depends on a selected illumination source;
   said correction signal being offset to the white balanced video signal so correcting the white-balanced video signal to provide a video signal such that a color impression displayed by a monitor of a white surface photographed by the imaging device and illuminated with the selected illumination source corresponds closely to an actual color impression of the white surface resulting from direct observation by a human eye and based on the selected illumination source.

8. The image processing unit according to claim 7, in which the correction unit determines the selected illumination source from the video signal supplied by the imaging device that has not been balanced.

9. The image processing unit according to claim 8, in which the correction unit identifies the selected illumination source from difference amounts of different color components of the video signal.

10. The image processing unit according to claim 7, in which the correction unit includes a memory from which a value of the correction signal is read out depending on the selected illumination source.

* * * * *

UNITED STATES PATENT AND TRADEMARK OFFICE
CERTIFICATE OF CORRECTION

PATENT NO.    : 6,597,396 B1
DATED         : July 22, 2003
INVENTOR(S)   : Quendt et al.

It is certified that error appears in the above-identified patent and that said Letters Patent is hereby corrected as shown below:

<u>Column 6,</u>
Line 6, change "select" to -- selected --.

Signed and Sealed this

Ninth Day of December, 2003

JAMES E. ROGAN
*Director of the United States Patent and Trademark Office*